UNITED STATES PATENT OFFICE.

SPENCER B. NEWBERRY, OF CLEVELAND, OHIO.

BASIC REFRACTORY BRICK.

1,400,087.     Specification of Letters Patent.     Patented Dec. 13, 1921.

No Drawing.     Application filed November 19, 1920. Serial No. 425,236.

*To all whom it may concern:*

Be it known that I, SPENCER B. NEWBERRY, a citizen of the United States, and resident of Cleveland, in the county of Cuyahoga, State of Ohio, have invented certain new and useful Improvements in Basic Refractory Bricks, of which the following is a specification.

This invention relates to a new and useful composition of materials to form bricks or blocks of a basic character for the lining of kilns or furnaces, especially suitable for use in kilns for the calcination of cement or other materials of an alkaline or basic composition.

It is well known that kilns for the burning of cement are in some cases lined with Portland cement clinker, by crushing the clinker, mixing it with ground cement and ramming the mixture into place as an interior coating, or molding the mixture into blocks, allowing these to set and harden and then placing these blocks in the kiln in the same manner as fire brick. Such a lining has, however, the serious defect in use that the part lying below the surface and subjected to only moderate heat becomes dehydrated and loses practically all its cohesion. In consequence the surface of the lining tends to become loosened and to scale off. Another fault is that when the kiln is for any reason allowed to cool down after long-continued heating, the clinker tends to "dust" or fall to powder. These defects have prevented clinker linings from coming into extensive use.

I have found that the tendency of cement clinker to fall to powder after long heating can be completely overcome by increasing the lime content to a point considerably above that of normal Portland cement. For example, Portland cement clinker contains ordinarily about 65 per cent. of lime and 31 per cent. argillaceous matter, the latter consisting chiefly of silica, alumina and iron oxid. The ratio of lime to argillaceous is therefore approximately 2.10 to 1. If, now, the lime is increased to 68 or 70 per cent., the argillaceous matter being correspondingly reduced, the clinker will be "over-limed" and when ground to cement and mixed with water will expand and crack, showing "unsoundness". Such over-limed clinker, however, if not ground, or merely crushed and freed from powder by sifting, will remain unchanged when exposed to the air, and will even stand exposure to hot steam without disintegrating. On still further increasing the lime, say to 73 per cent. or more, a point is reached at which the clinker will air-slake after some days or weeks in moist air. Between these limits of composition, that of Portland cement containing approximately 65 per cent. of lime and 31 per cent. argillaceous matter, and that of air-slaking clinker containing about 72 to 75 per cent. lime and 24 to 21 per cent. argillaceous matter, a clinker may be made, by thorough burning at high heat, which will not disintegrate, either after long-continued heating or on long storage in air. The exact composition between the above limits which will give the best practical result in use will of course vary with different materials, especially with varying proportions of silica, alumina and iron oxid in the argillaceous material employed, and must be determined by experiment with the ingredients which are available.

The approximate composition of typical clinkers of the three classes named may be tabulated as follows:

|  | Portland cement clinker. | High-limed clinker. | Air-slaking clinker. |
|---|---|---|---|
| Lime | 65 | 69 | 74 |
| Argillaceous | 31 | 27 | 22 |
| Magnesia, alkalis, etc. | 4 | 4 | 4 |
|  | 100 | 100 | 100 |
| Ratio of lime to argillaceous | 2.10 | 2.55 | 3.36 |

Similar clinkers may be made from magnesian limestone and argillaceous material. In this case the ratios of lime to argillaceous matter are the same as those given above, since the tendency of the clinkers to fall to powder after long heating and to swell and slake in moist air depends on the relative proportions of lime and argillaceous matter, the magnesia being practically inert. The composition of typical magnesian clinkers made from dolomite limestone and clay, of the three classes named, is approximately as follows:

|  | Magnesian cement clinker. | Magnesian high-lime clinker. | Magnesian air-slaking clinker. |
|---|---|---|---|
| Lime | 41.2 | 42.7 | 44.5 |
| Magnesia | 39.1 | 40.6 | 42.2 |
| Argillaceous | 19.7 | 16.7 | 13.3 |
|  | 100.0 | 100.0 | 100.0 |
| Ratio of lime to argillaceous | 2.10 | 2.55 | 3.35 |

Clinkers made from moderately magnesian limestones will have compositions intermediate between those given in these two tables, and if a constant ratio of lime to argillaceous matter is maintained they will show similar properties whatever proportion of magnesia they may contain. It should be said, however, that the presence of a considerable percentage of magnesia produces clinker of greater density and less tendency to air-slaking than that shown by mixtures low in magnesia. It is therefore possible to carry the lime-argillaceous ratio higher in magnesian than in non-magnesian clinker. Practically, I have found that clinkers in which the lime-argillaceous ratio is from 2.30 to 3 are free from tendency to fall to dust after long heating or to swell or slake in air, and have obtained most satisfactory results with a ratio of 2.40 to 2.60.

The degree of burning has also an important effect on the stability of the clinker, and for satisfactory permanence in air, especially with high lime ratios, it is necessary that the mixture be calcined at a temperature as high or higher than that employed in burning Portland cement, or from 2700 to 3000 degrees F. The calcination may be effected in any type of kiln or furnace adapted to develop the required temperature, but is most economically done in rotary kilns in a manner similar to the burning of cement.

To form the product into bricks or blocks the clinker is crushed to pass a one-half to one-fourth inch screen, and freed from dust by means of a screen of 40 to 60 meshes per inch. To the crushed clinker is then added one-sixth to one-half its weight of powdered raw mixture, similar to but more fusible than that from which the clinker was made. This greater fusibility may be secured by reducing the lime-argillaceous ratio of the added mixture, for example to a point equal to or lower than that of Portland cement, or by the addition of a small percentage of a flux, such as fluorspar, borax or soda. As little as 2 per cent. of either of these fluxes considerably increases the fusibility of the bonding material. Water or other liquid substance is then added in small quantity and the materials are thoroughly mixed and molded into forms by tamping or pressure. The molded bricks are dried and burned in kilns in the same manner as fire brick, at a temperature of 2700 to 3000 degrees F. After gradual cooling the bricks are ready for use in the lining of kilns.

The purpose of the addition of raw mixture of greater fusibility is to form a bond, more fusible than the clinker itself, to unite the particles of clinker into a solid mass. When the bricks are burned, this bonding mixture fuses and is in part absorbed by the clinker particles and in part takes up lime from the clinker, becoming thus less fusible and tending to bring the mass to more homogeneous composition and to make the bricks firm and coherent. It is of course understood that instead of raw mixture, previously burned mixtures of similar composition in the form of powder, or Portland cement, may be used with the same effect. If desired, also, the brick may be made lighter and more porous by the addition of sawdust or other combustible substance to the mixture, as is commonly done in making porous clay brick.

In the following claims certain terms used are to be understood as follows:

"Argillaceous matter," the principal substance of clay, fire-clay, shale or slag, consisting of silica, alumina and iron oxid in varying proportions.

"Lime-argillaceous ratio," the figure obtained by dividing the percentage of lime by that of argillaceous matter.

"Mixture of lime and argillaceous matter" is understood to include comparatively pure lime or magnesian lime or materials intermediate between these, either in the form of burned lime or of carbonates.

Having thus described my invention what I claim as new and desire to secure by Letters Patent is:

1. The process of making basic refractory brick by calcining a mixture of lime and argillaceous matter in such proportions that the resulting clinker will not disintegrate after long-continued heating or on exposure to air, adding to the clinker a mixture of lime and argillaceous matter of greater fusibility than the clinker, molding the mixture into blocks and burning the blocks at approximately the temperature used in burning ordinary fire brick.

2. The process of making basic refractory brick by calcining a mixture of lime and argillaceous matter of a lime-argillaceous ratio of 2.10 to 3.35, adding to the resulting clinker a mixture of lime and argillaceous matter of lower lime-argillaceous ratio and greater fusibility than the clinker, molding the mixture into blocks and burning the blocks at a temperature of 2700 to 3000 degrees F.

3. The process of making basic refractory brick by calcining a mixture of lime and argillaceous matter in such proportions that the resulting clinker will not disintegrate after long-continued heating or on exposure to air, crushing the clinker and freeing it from dust by sifting, adding to the clinker a mixture of lime and argillaceous matter of greater fusibility than the clinker, molding the mixture into blocks and burning the blocks at approximately the temperature used in burning ordinary fire brick.

4. The process of making basic refractory brick by calcining a mixture of lime and argillaceous matter of a lime-argillaceous